United States Patent
Duluk, Jr.

(10) Patent No.: US 9,430,400 B2
(45) Date of Patent: Aug. 30, 2016

(54) MIGRATION DIRECTIVES IN A UNIFIED VIRTUAL MEMORY SYSTEM ARCHITECTURE

(71) Applicant: NVIDIA CORPORATION, Santa Clara, CA (US)

(72) Inventor: Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 60 days.

(21) Appl. No.: 14/109,712

(22) Filed: Dec. 17, 2013

(65) Prior Publication Data

US 2014/0281323 A1 Sep. 18, 2014

Related U.S. Application Data

(60) Provisional application No. 61/785,707, filed on Mar. 14, 2013, provisional application No. 61/800,004, filed on Mar. 15, 2013.

(51) Int. Cl.
  *G06F 12/00* (2006.01)
  *G06F 12/10* (2016.01)
  *G06F 12/08* (2016.01)

(52) U.S. Cl.
  CPC .......... *G06F 12/1027* (2013.01); *G06F 12/08* (2013.01); *G06F 12/1009* (2013.01)

(58) Field of Classification Search
  CPC . G06F 12/08; G06F 12/1009; G06F 12/1027
  See application file for complete search history.

(56) References Cited

U.S. PATENT DOCUMENTS

| | | | | |
|---|---|---|---|---|
| 2005/0273571 A1* | 12/2005 | Lyon et al. | ................... | 711/203 |
| 2009/0228535 A1* | 9/2009 | Rathi et al. | ................... | 707/204 |
| 2011/0023048 A1* | 1/2011 | Srinivasan | .................... | 718/105 |
| 2012/0272016 A1* | 10/2012 | Bello | .................... | G06F 9/5077 |
| | | | | 711/154 |

\* cited by examiner

*Primary Examiner* — Aracelis Ruiz
(74) *Attorney, Agent, or Firm* — Artegis Law Group, LLP

(57) ABSTRACT

One embodiment of the present invention sets forth a computer-implemented method for altering migration rules for a unified virtual memory system. The method includes detecting that a migration rule trigger has been satisfied. The method also includes identifying a migration rule action that is associated with the migration rule trigger. The method further includes executing the migration rule action. Other embodiments of the present invention include a computer-readable medium, a computing device, and a unified virtual memory subsystem. One advantage of the disclosed approach is that various settings of the unified virtual memory system may be modified during program execution. This ability to alter the settings allows for an application to vary the manner in which memory pages are migrated and otherwise manipulated, which provides the application the ability to optimize the unified virtual memory system for efficient execution.

21 Claims, 6 Drawing Sheets

MIGRATION DIRECTIVES IN A UNIFIED VIRTUAL MEMORY SYSTEM ARCHITECTURE

CROSS-REFERENCE TO RELATED APPLICATIONS

This application claims benefit of U.S. provisional patent application Ser. No. 61/785,707, filed Mar. 14, 2013 and titled "Migration Directives." This application also claims the priority benefit of the U.S. provisional patent application Ser. No. 61/800,004, filed Mar. 15, 2013 and titled "CPU-To-GPU and GPU-To-GPU Atomics." The subject matter of these related applications is hereby incorporated herein by reference.

BACKGROUND OF THE INVENTION

1. Field of the Invention

Embodiments of the present invention relate generally to virtual memory, and, more specifically, to migration directives in a unified virtual memory system architecture.

2. Description of the Related Art

Most modern computer systems typically implement some type of virtual memory architecture. Among other things, the virtual memory architecture enables instructions to access memory using virtual memory addresses, rather than physical memory addresses. By providing this virtual memory layer between physical memory and application software, user-level software is shielded from the details of physical memory management, which is left to a dedicated memory management system.

A typical computer system that implements a virtual memory architecture includes a central processing unit (CPU) and one or more parallel processing units (GPUs). In operation, a software process executing on either a CPU or a GPU may request data via a virtual memory address. In many traditional architectures, the virtual memory systems that handle requests for data via virtual memory addresses for a CPU and a GPU are independent. More specifically, a separate CPU memory management system and a separate GPU memory management system handle requests for data from the CPU and GPU, respectively.

Some computer systems implement a shared memory architecture, in which multiple processors, such as a CPU and a GPU, may access multiple physical memory units. In such shared memory architectures, software or hardware actors that control memory perform various operations such as changing access permissions for memory pages, copying memory pages, and the like. Additionally, in such shared memory architectures, many different settings by which these various operations may be performed are possible.

Compiler directives are a mechanism by which a program writer may request that a compiler perform certain operations when the code is executed on a certain type of computer platform. As such, a program's source code may include compiler directives directed at more than platform, and depending on the platform and compiler being used, the compiler will generate object code optimized for the specific platform. Because this mechanism is a compiler directive, the compiler is able to convert the directives to appropriate computer instructions based on a system architecture at compile-time. Many compiler directives exist. For example, compiler directives exist for copying memory from one processor's memory to another processor's memory. Many standards implement compiler directives. For example, OpenACC, OpenHMPP, and OpenMP all implement compiler directives. While compiler directive standards exist, no comprehensive standard for compiler directives for a shared memory architecture exists.

As the foregoing illustrates, what is needed is a comprehensive standard for compiler directives for a shared memory architecture.

SUMMARY OF THE INVENTION

One embodiment of the present invention sets forth a computer-implemented method for altering migration rules for a unified virtual memory system. The method includes detecting that a migration rule trigger has been satisfied. The method also includes identifying a migration rule action that is associated with the migration rule trigger. The method further includes executing the migration rule action. Other embodiments of the present invention include a computer-readable medium, a computing device, and a unified virtual memory subsystem.

One advantage of the disclosed approach is that various settings of the unified virtual memory system may be modified during program execution. This ability to alter the settings allows for an application to vary the manner in which memory pages are migrated and otherwise manipulated, which provides the application the ability to optimize the unified virtual memory system for efficient execution. Another advantage is that a large number of different settings may be altered, which provides the application with a great deal of flexibility in optimizing the unified virtual memory system. A further advantage is that if the migration rule instructions are embodied as compiler directives, then the application program writer may rely on the compiler to determine an appropriate system call. These compiler directives allow an application programmer to write a single set of instructions related to migration rules for multiple different platforms, which speeds up the application development process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
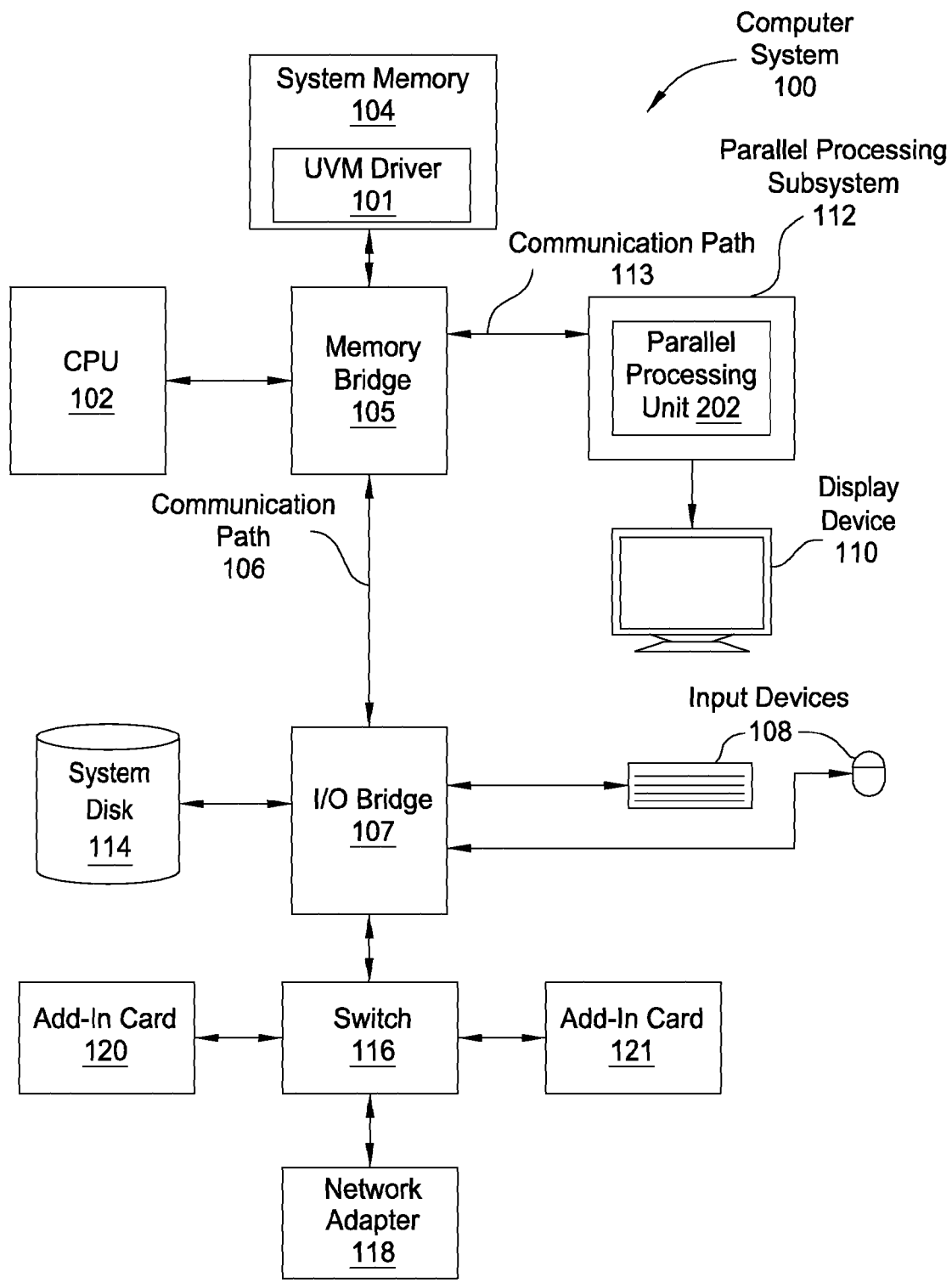
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
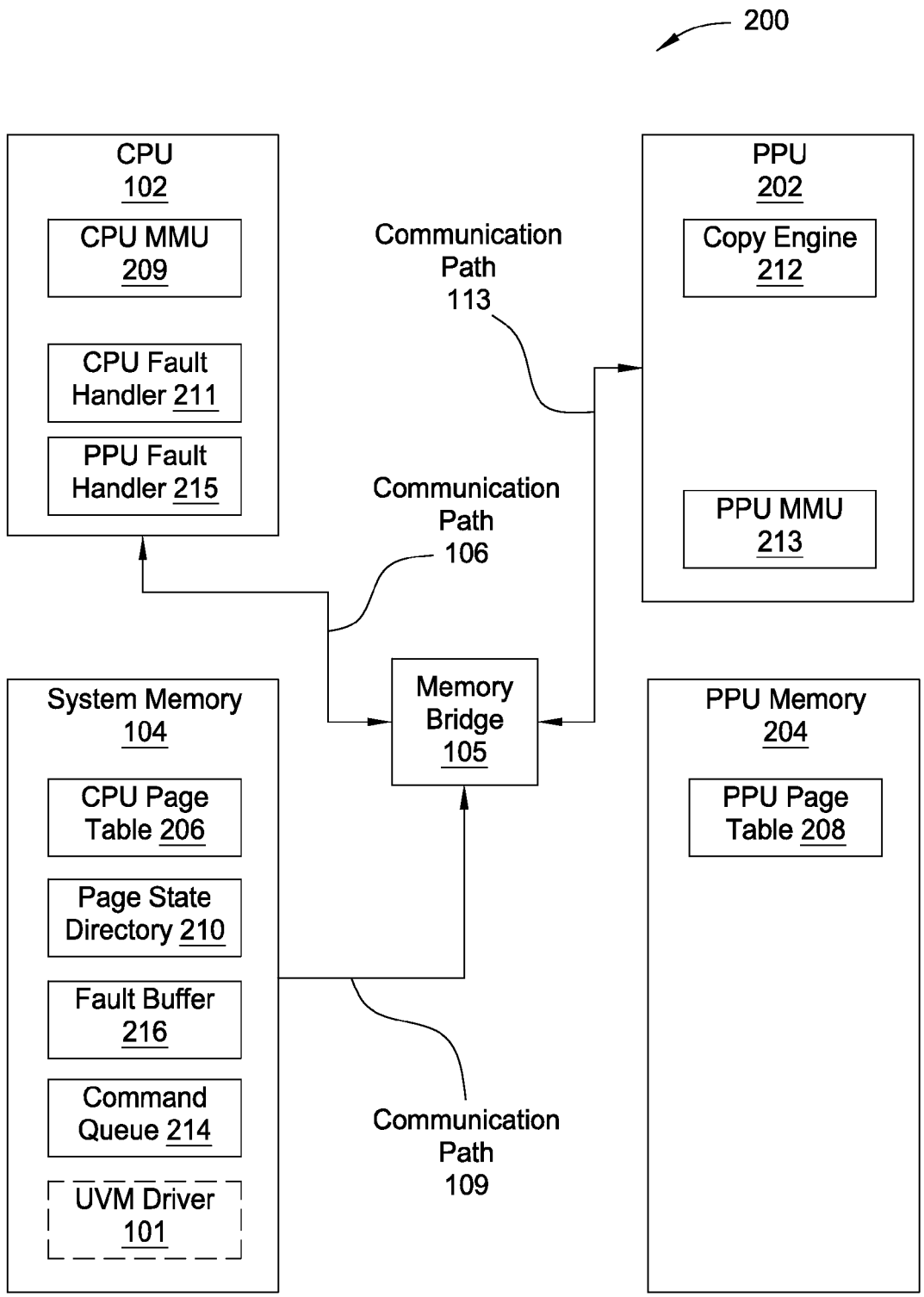
FIG. 2 is a block diagram illustrating a unified virtual memory system, according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data).

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to both the CPU 102 and the PPU 202;

(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;

(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;

(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Migration Directives

In operation, UVM driver 101 is configured to algorithmically determine when memory pages should be transmitted between memory units and/or when page states (including, for example, ownership states) for the memory pages should change. In addition to such algorithmic determinations, software executing on CPU 102 or PPU 202 may register, with UVM driver 101, various rules for determining when memory pages should be transmitted between memory units, and/or when page states for the memory pages should change. Such rules may specify, for example, that a memory page stored in system memory 104 should be transmitted to PPU memory 204 when a PPU 202 first accesses the memory page. Additional examples are provided below.

Figure 3:
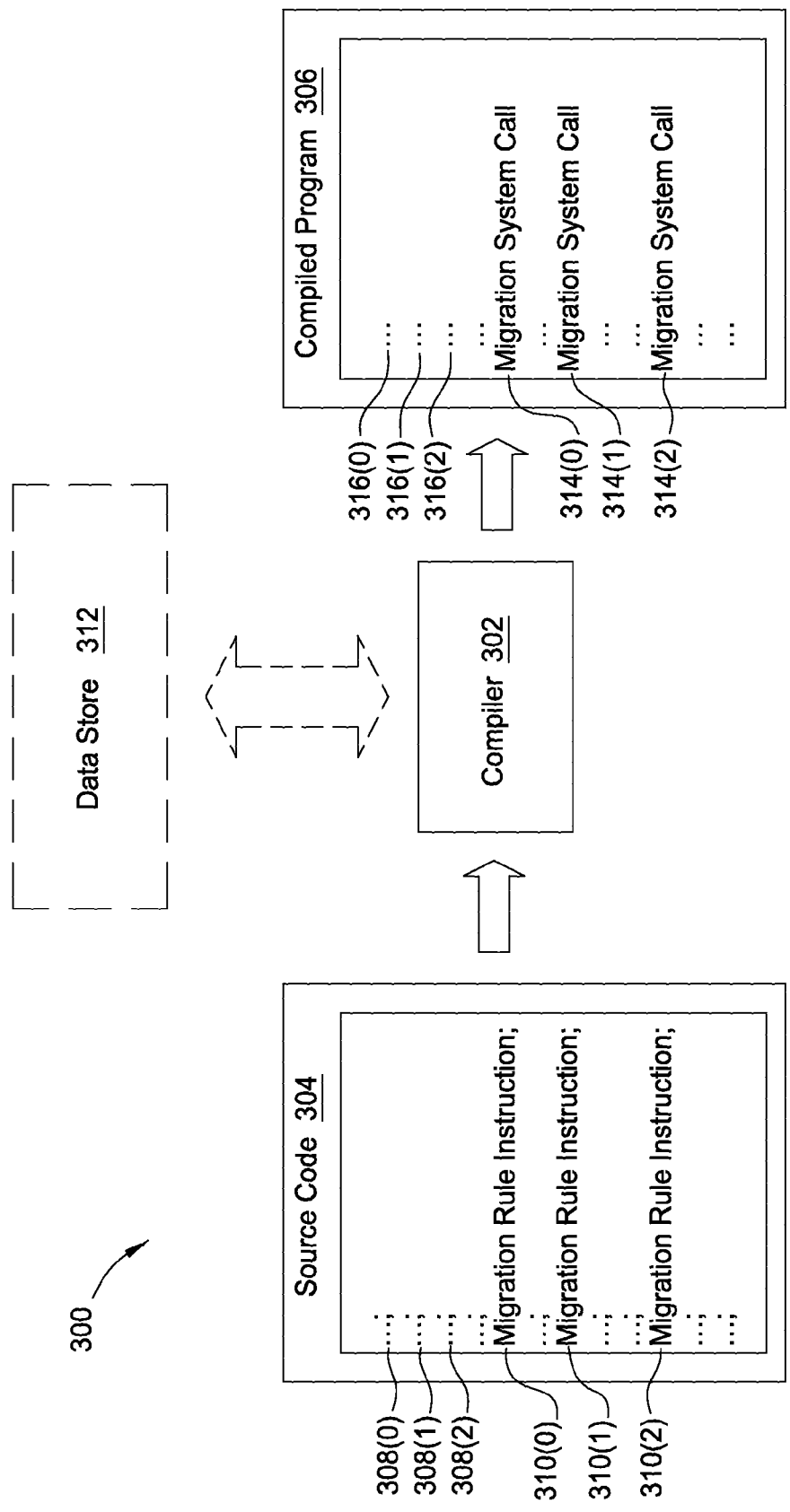
FIG. 3 is a conceptual illustration of a sequence of compiler operations for generating a compiled program from source code including migration rules for controlling migration of memory pages supervised by UVM system, according to one embodiment of the present invention.

FIG. 3 is a conceptual illustration of a sequence of compiler operations 300 for generating a compiled program 306 from source code 304 that includes migration rules 310 for controlling migration of memory pages supervised by UVM system 200, according to one embodiment of the present invention. The source code migration rules can be compiler directives. As shown, compiler 302 accepts source code 304 and generates a compiled program 306 in response. Source code 304 includes program instructions for execution by CPU 102, PPU 202, or both. The program instructions include migration rule instructions 310, as well as other types of instructions 308. During compilation, when the compiler 302 recognizes the migration rule instructions 310, the compiler 302 converts the migration rule instructions 310 into migration system calls 314, and converts other instructions into compiled instructions 316, as is generally known.

In some embodiments, migration rule instructions are compiler directives, and compiler 302 consults data store 312 in order to translate the migration rule instructions 310 into migration system calls 314. The data store 312 stores platform-specific information for such translations. More specifically, the platform-specific information indicates what migration system calls 314 the migration rule instructions 310 should be translated to, based on the target platform for which the compiler is compiling.

Figure 4:
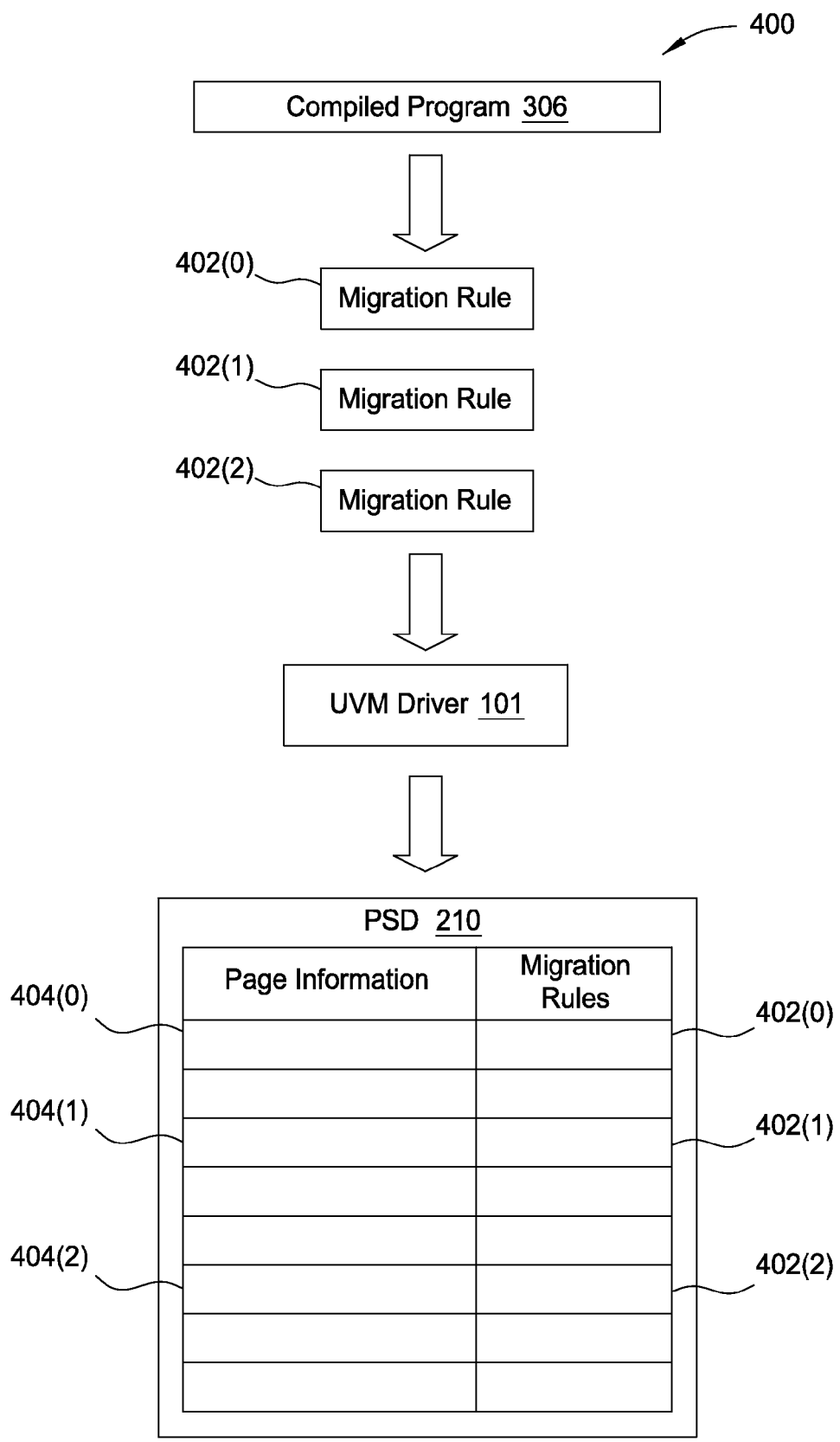
FIG. 4 is a conceptual illustration of a sequence of driver operations for recording migration rules for controlling migration of memory pages supervised by UVM system, according to one embodiment of the present invention.

FIG. 4 is a conceptual illustration of a sequence of driver operations 400 for recording migration rules 402 for controlling migration of memory pages supervised by UVM system, according to one embodiment of the present invention. As shown, CPU and/or PPU 202 executes compiled program 306, which includes migration system calls 314. When executed, migration system calls 314 inform UVM driver 101 of particular migration rules 402. In response to receiving the particular migration rules 402 from the application program 306, UVM driver 101 stores the migration rules 402 for future access.

In some embodiments, the UVM driver 101 stores information regarding the rules in one or more page state directories 210. More specifically, within page state directory entries 404 in PSD 210, is a slot by which UVM driver 101 associates the PSD entries 404 with particular migration rules 402. As described above, the PSD entries 404 are associated with memory pages and include page information for translating a particular virtual address associated with a memory page into a physical address. The page information in PSD entries 404 also describe the ownership state for memory pages, as described above with respect to FIG. 2. By associating migration rules 402 with particular PSD entries 404, the migration rules 402 are associated with particular memory pages. The UVM driver 101 may also store migration rules 402 in a migration rule store, which may be located within system memory 104, PPU memory 204, or some other location. Note that, because the application program informs the UVM driver 101 of the migration rules while the application program is running, the rules may be changed as the application program executes. Runtime modification is advantageous and provides flexibility to change migration rules as application programs are executed.

Programs running in SMs may execute migration rule instructions 310. Such programs may specify whether all CTAS execute such migration rule instructions 310 or whether only a first CTA executes such migration rule instructions. Only a first thread in each CTA executes migration rule instructions. Programs running in CPU 102 may also execute migration rule instructions 310.

Figure 5:
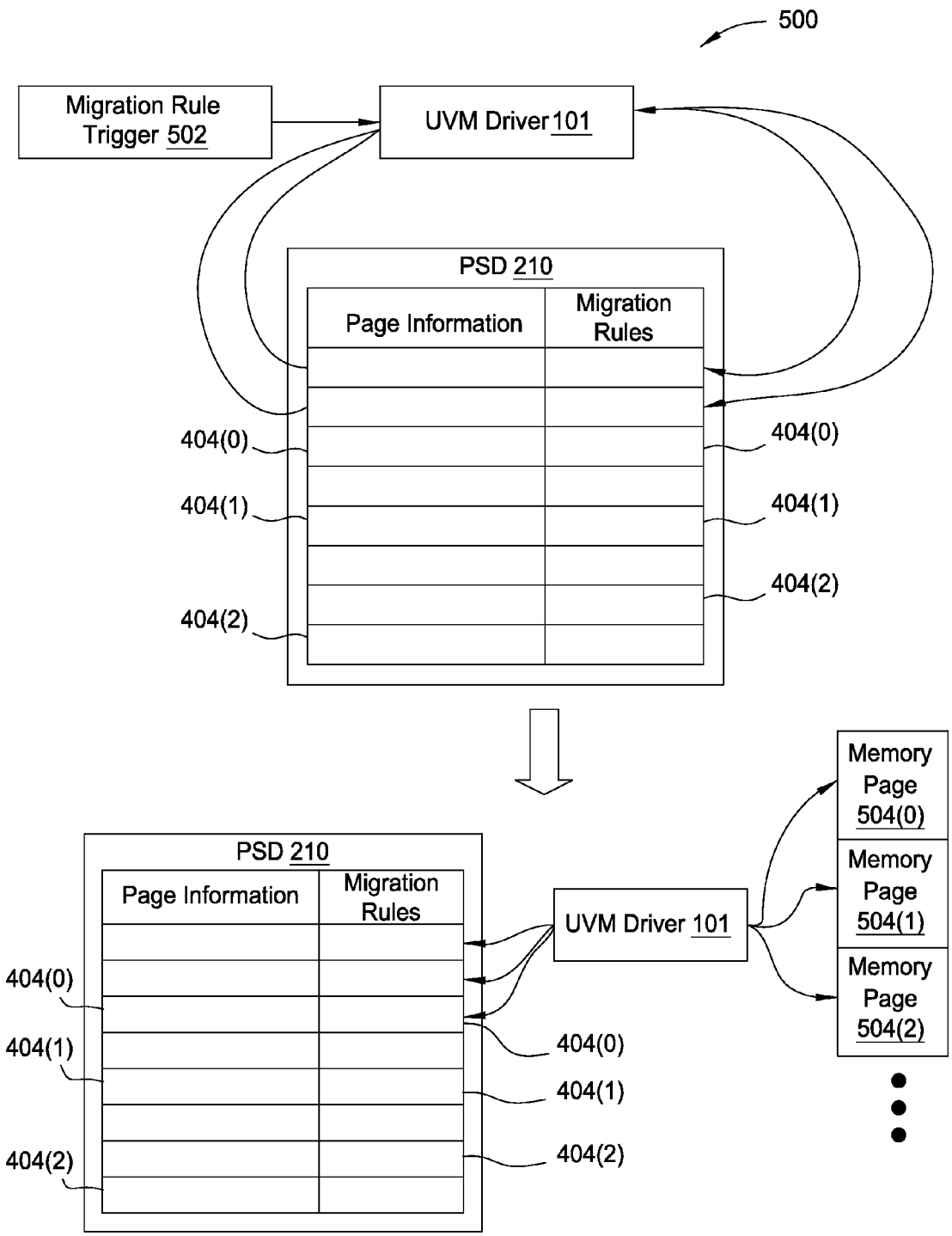
FIG. 5 is a conceptual illustration of a sequence of driver operations for implementing migration rules for controlling migration of memory pages supervised by UVM system, according to one embodiment of the present invention.

FIG. 5 is a conceptual illustration of a sequence of driver operations 500 for implementing migration rules 402 for controlling migration of memory pages supervised by UVM system, according to one embodiment of the present invention. The migration rules 402 maintained by the UVM driver 101 affect the manner in which the UVM driver 101 manages memory pages and the PSD 210. More specifically, the UVM driver 101 maintains a wide variety of different migration rules 402 that specify various actions to be taken, and various conditions that trigger such actions. When the UVM driver 101 detects a particular migration rule trigger 502, the UVM driver 101 consults the migration rules 402 to determine what actions ("migration rule actions") to take in response to the migration rule trigger 502. Migration rules 402 are stored as a migration rule trigger and an associated migration rule action. Examples of both the migration rule triggers, as well as migration rule actions are now described.

Migration Rule Triggers

Various migration rule triggers are possible. Migration rule triggers may include certain type of memory accesses. Migration rule triggers may occur at page faults. More specifically, migration rules triggers may specify a read access, a write access, or any type of access (read or write) as a trigger. Such migration rule triggers may also specify which unit performs the particular access in order to satisfy the trigger. For example, and without limitation, migration rules may specify that an access from a particular CPU 102, a particular GPU 202, or any unit, may satisfy the trigger. Such migration rule triggers may also specify the ordinality of a particular access that satisfies the trigger. For example, and without limitation, the migration rule trigger may specify that an access that satisfies the trigger is the first access of the specified type. Ordinality of an access is in relation to the point in program execution at which a particular migration rule is set (in other words, the point at which a migration rule instruction is executed. Thus, a trigger that specifies a "first" access is satisfied upon a first access of a specified type that occurs after the migration rule referencing the "first" access is set.

Migration rule triggers may also specify a particular memory page or set of memory pages that, when accessed, satisfies the migration rule trigger. Such migration rule triggers may specify all memory pages within a particular data structure, which may be specified by a starting virtual address and a size. Such migration rule triggers may also specify individual memory pages within a particular data structure. Some migration rule triggers may be immediate triggers, where the trigger is satisfied when the migration rule instruction that specifies the migration rule trigger is executed. Some migration rule triggers may specify a particular page fault that must occur for the trigger to be satisfied.

Migration Rule Actions

Upon the trigger being satisfied, the associated migration rule action is executed. Migration rules may specify migration rule actions out of a large number of different migration rule actions. Several non-limiting examples are provided below.

One migration rule action is copying a memory page from one memory unit to another memory unit, where the memory units may be, for example, PPU memory 204 or system memory 104. A migration rule action may specify the number of pages to copy and their relation to the fault address, so one, or more than one memory page are to be to copied. For example, a migration rule action may specify that all pages in a particular data structure are to be copied. The data structure may be specified with a beginning virtual address and a data structure size. A migration rule may also specify a particular stride, in one, two, and/or three dimensions. The stride determines which pages to copy. Addresses of memory pages in memory may be treated as occupying one, two, or three-dimensions, as is generally known. A stride specifies "jumps" in one, two, or three dimensions, at which memory pages to be copied are located. A migration rule for a particular data structure is only in effect while the data structure exists. As such, a migration rule can be used after memory storing the data structure is allocated in memory, typically by a malloc call, and the compiler removes this migration rule when the memory for the data structure is de-allocated, typically by a call to a memory free routine.

Another migration rule action relates to a phenomenon known as "thrashing." Various factors may cause page migrations to happen, as described above with respect to FIG. 2. In some situations, memory pages may be repeatedly migrated back and forth between two memories. Repeatedly copying memory pages back and forth in this manner consumes computer resources and is therefore inefficient. Consequently, UVM system 200 maintains counters that keep track of how many times a particular memory page has been migrated. If the number of times a memory page has been migrated exceeds a threshold, then the ownership state of the memory page may be changed to a shared state, instead of an owned state, which prevents thrashing. A migration rule action may alter this threshold. Further, a migration rule may alter the current count of the number of times that a particular memory page has been copied. For example, a migration rule may alter the count to a value of "zero," such that the process of keeping track of the number of times that a memory page has been copied is effectively reset for that memory page.

Another migration rule action relates to page sizes in memory units such as system memory 104 and PPU memory 204. Different memory units, such as system memory 104 and PPU memory 204, may store memory pages of different sizes. A migration rule action may change the size of memory pages in a particular memory unit.

A further migration rule action relates to mechanisms related to the fact that different memory units (such as system memory 104 and PPU memory 204) may store differently-sized memory pages. When a memory page is migrated from one memory unit (such as system memory 104 or PPU memory 204) to another memory unit (such as system memory 104 or PPU memory 204), the UVM system 200 may take steps to accommodate a difference in memory page sizes. Such steps may include dividing a memory page into smaller pages, or, conversely, coalescing multiple small-sized memory pages into a larger-sized memory page. A migration rule action may specify changes to rules related to dividing or coalescing memory pages. One example of such a migration rule action is a change to prevent multiple repetitive coalesce operations followed by dividing operations. Such a migration rule action may specify the number of times that a particular memory page may trigger a coalesce operation followed by a divide operation before determining not to perform further coalesce or divide operations.

An additional migration rule action is related to atomic operations. Atomic operations involving a particular memory location or memory page are operations that are performed on that memory page in such a way that no other operations may be performed on that memory location or memory page while the atomic operation is performed. Because memory pages may be shared between different processing units, such as CPU 102 and PPU 202, UVM system 202 manages the manner in which atomic operations are executed. More specifically, the UVM system 202 receives requests to access memory pages. The PSD 210 may store access permissions for memory pages, including whether particular memory pages may be accessed with atomic operations. When a processing unit, such as CPU 102 or PPU 202 attempts to atomically access a memory page for which that processing unit is not allowed to atomically access the memory page, a page fault sequence occurs. Generally speaking, the page fault sequence disallows access to that memory page for other processing units, allows the atomic operation to execute, and then allows the other processing units to again access that memory page. The migration rule actions may specify various rules related to handling atomic memory access, including the sequence of access type changes, reduction operations, and other rules.

A further migration rule action involves behavior related to copy-on-write operations. A copy-on-write operation is an operation in which a particular memory page that is being accessed concurrently by multiple different processes is maintained as a single physical memory page until one of the processes performs a write operation to that memory page. When the process performs the write operation, the memory page is copied to a new physical memory location, which is then associated with the process that performs the write operation. The write operation is performed on the copied page. In this way, memory utilization may be minimized when no writes are performed. In the migration rule action related to copy-on-write operations, the migration rule action may affect copy-on-write behavior. For instance, such migration rule actions may specify that copy-on-write behavior is to be utilized for a particular memory page, is not to be utilized for a particular memory page, is to be utilized for a certain block of memory pages, or may specify other rules related to copy-on-write behavior. These migration rule actions may also specify what type of access triggers copy-on-write behavior.

An additional migration rule action involves behavior related to zero-fill-on-demand operations. Zero-fill-on-demand operations occur if a memory page that is allocated as a zero-fill-on-demand memory page is accessed. In such a situation, a page fault occurs, a memory page is allocated, and the values stored in the memory page are set to zero for the allocated memory page. Various settings or rules are possible for zero-fill-on-demand operations. For example, if a memory page that is set as a zero-fill-on-demand memory page is migrated, then that memory page may be filled with zeroes or not filled with zeroes, depending on zero-fill-on-demand settings. Migration rule actions may alter such settings and/or rules associated with zero-fill-on-demand memory pages.

Another migration rule action involves behavior related to evicting memory pages from a smaller memory unit to a larger memory unit (for example, from PPU memory 204 to system memory 104). As described above, some of the memory pages that are tracked by the UVM system 200 are stored in the PPU memory 204. At certain times, the UVM system 200 may evict memory pages from the PPU memory 204 to the system memory 104. For example, if the PPU memory 204 is full when a new memory page is to be migrated to the PPU memory 204, the UVM system 200 evicts some of the memory pages stored in the PPU memory 204 such that those memory pages are now stored in the system memory 104. The UVM system 200 implements certain eviction policies to determine which memory pages to evict from the PPU memory 204 to the system memory 104.

Some migration rule actions alter the eviction policies implemented by the UVM system 200. Such migration rule actions may specify eviction policies within a particular data structure defined with a starting address and a size. Such migration rule actions may apply a least-recently-used policy, a lowest-address-first policy, a highest-address-first policy, a random policy, a distance-from-origin policy, or other policies as are generally known to those of ordinary skill in the art. Specifying one of these eviction policies for a particular data structure causes the UVM system 200 to apply that eviction policy to the memory pages within a given data structure, but does not necessarily change the eviction policy for memory pages that are outside of the data structure. An additional migration rule action is also related to eviction. More specifically, this migration rule action sets the eviction priority between data structures or regions of memory. These eviction priorities determine the order in which data structures or regions of memory are to be evicted.

A further migration rule action is related to changing migration setting configurations. A migration setting configuration is a collection of settings related to page migration, applied by the migration rule actions described above, or by some other mechanism. Various settings may be possible and associated with different system configurations. The different system configurations refer to features such as amount of system memory 104, amount of PPU memory 204, number of processing units (such as SM's), and other related features. A migration rule action may specify that a particular setting configuration is associated with a particular system configuration or range of system configurations. When the application program including such migration setting actions is run or compiled, the executable or compiler determines which system configuration exists, and therefore which setting configuration to enable.

Several example complete migration rules 402 are now provided. In a first example migration rule 402, the migration rule trigger is a first read access to any page included in a particular data structure. The associated migration rule action is to modify the accessed page to be read-only for the PPU 202. If such a migration rule 402 is stored by the UVM driver 101, then when a first read access occurs on a memory page in the specified data structure, the UVM driver 101 changes the access permissions for that memory page to be read-only.

In a second example migration rule 402, the migration rule trigger is a first write access to any page included in a particular data structure. The associated migration rule action is to migrate the accessed page as well as two other pages, specified with a stride of 5, to PPU memory 204 from system memory 104. If such a migration rule 402 is stored by the UVM driver 101, then when a first write access occurs on a memory page in the specified data structure, the UVM driver 101 migrates the accessed page and two other pages specified with a stride of 5 to PPU memory 204 from system memory 104.

In a third example migration rule 402, the migration rule trigger is an access of any type by the CPU 102 to any page in a particular data structure. The associated migration rule action is to migrate all memory pages in the entire data structure that are stored in PPU memory 204 to system memory 104. If such a migration rule 402 is stored by the UVM driver 101, then when any access to any page in the data structure occurs, the UVM driver 101 causes all memory pages associated with the data structure to be migrated to system memory 104.

In a fourth example migration rule 402, the migration rule trigger is an access of any type by a PPU 202 to any memory page in a specified data structure. The associated migration rule action is migrating all memory pages in that data structure to system memory 104. If such a migration rule 402 is stored by the UVM driver 101, then when any access by a PPU 202 to a memory page in the data structure occurs, the UVM driver 101 causes all memory pages included in the data structure to be migrated to system memory 104.

In a fifth example migration 402, the migration rule trigger is an immediate trigger. The associated migration rule action is migrating all memory pages in a particular data structure to PPU memory 204. If such a migration rule 402 is stored by the UVM driver 101, then when the migration driver 101 is informed of the migration rule 402, the migration driver 101 causes all memory pages in the data structure to be migrated to PPU memory 204.

The following is an example of a simple program with UVM compiler directives:

```
int main (void)
{
    int dsize = 2^30;
    float *data;
    data = (float*) malloc(dsize);
    fill_data_array(*data, dsize);   // fill the data array with values
    int isize = 2^20;
    float *indices;
    indices = (int*) malloc(isize);
    fill_index_array(*indices, isize); // fill index array with values
    float result;
#pragma UVM migration target(gpu)
    transfer_size(page_64k_always)
#pragma UVM migration target(cpu)
    transfer_size(page_4k_always)
```

-continued

```
#pragma UVM migration target(cpu)
    in(data:length(dsize)) rule(first_sysmem_read_UVMess,
    convert_to_read_only)
#pragma UVM migration target(gpu)
    in(data:length(dsize)) rule(first_sysmem_write_UVMess,
    copy_3_pages, stride_5_pages)
#pragma UVM migration target(cpu)
    in(data:length(dsize)) rule(first_UVMess, all_pages)
    result = random_reduction(data, dsize, indices, isize);
    printf("%f\n", result);
    do_somthing_else_on_cpu(data);   // function wants all data on
    CPU
    result = reduction(data, dsize, indices, isize);
    printf("%f\n", result);
    do_somthing_else_on_cpu(data);
}
float random_reduction(float *data, size_t dsize,
    int *indices, size_t isize)
{
    float result = 0.f;
#pragma UVM offload target(gpu)
    in(indices:length(isize)) rule(first_UVMess, all_pages)
    for (int i=0; i<isize; ++i) {
        result += data[indices[i]];
    }
    return result;
}
float reduction (float *data, size_t size)
{
    float result = 0.f;
#pragma UVM offload target(gpu)
    in(indices:length(isize))
    for (int i=0; i<size; ++i) {
        result += data[i];
    }
    return result;
}
```

In the above code, the first #pragma informs the compiler to insert a system call that tells the UVM driver to apply the following rule to the data array: whenever a page is migrated to the GPU, always migrate pages in units of 64 kB pages. The second #pragma informs the compiler to insert a system call that tells the UVM driver to apply the following rule to the data array: whenever a page is migrated to the CPU, always migrate pages in units of 4 kB pages. These two rules might be treated as hints by the UVM driver, because more important considerations could take precedence; for example, part of a 64 kB page could be needed by the CPU while another part is needed by the GPU, so the UVM driver would split this 64 kB page into 4 kB pages and have some resident on the GPU and some on the CPU. For this reason, it would be advantageous for different data structures to not share the same pages, if they are to be migrated separately.

In the above code, the third #pragma informs the compiler to insert a system call that tells the UVM driver to apply the following rule to the data array: on the first read access by the GPU to a particular page in sysmem, change that page to be read-only for the GPU, but leave it in sysmem. The #pragma statements can be expressed in other embodiments for the same function, and strings (e.g., "first_sysmem_read_access") are used here to make the behavior more obvious.

In the above code, the fourth #pragma informs the compiler to insert a system call that tells the UVM driver to apply the following rule to the data array: on the first write access by the GPU to a particular page, migrate that page plus two other pages to gpumem, using a stride of 5 pages to identify the other two pages.

In the above code, the fifth #pragma informs the compiler to insert a system call that tells the UVM driver to apply the following rule to the data array: on the access of any type by the CPU to any page, migrate the entire data array to cpumem, but only pages that are in gpumem need to be migrated.

In the above code, the sixth #pragma informs the compiler to insert a system call that tells the UVM driver to apply the following rule to the index array: on the access of any type by the GPU to any page, migrate the entire index array to cpumem.

In the above code, the seventh #pragma informs the compiler to synchronously copy the data array to gpumem, by doing a memory copy, a cudaMemcpy( ).

Figure 6:
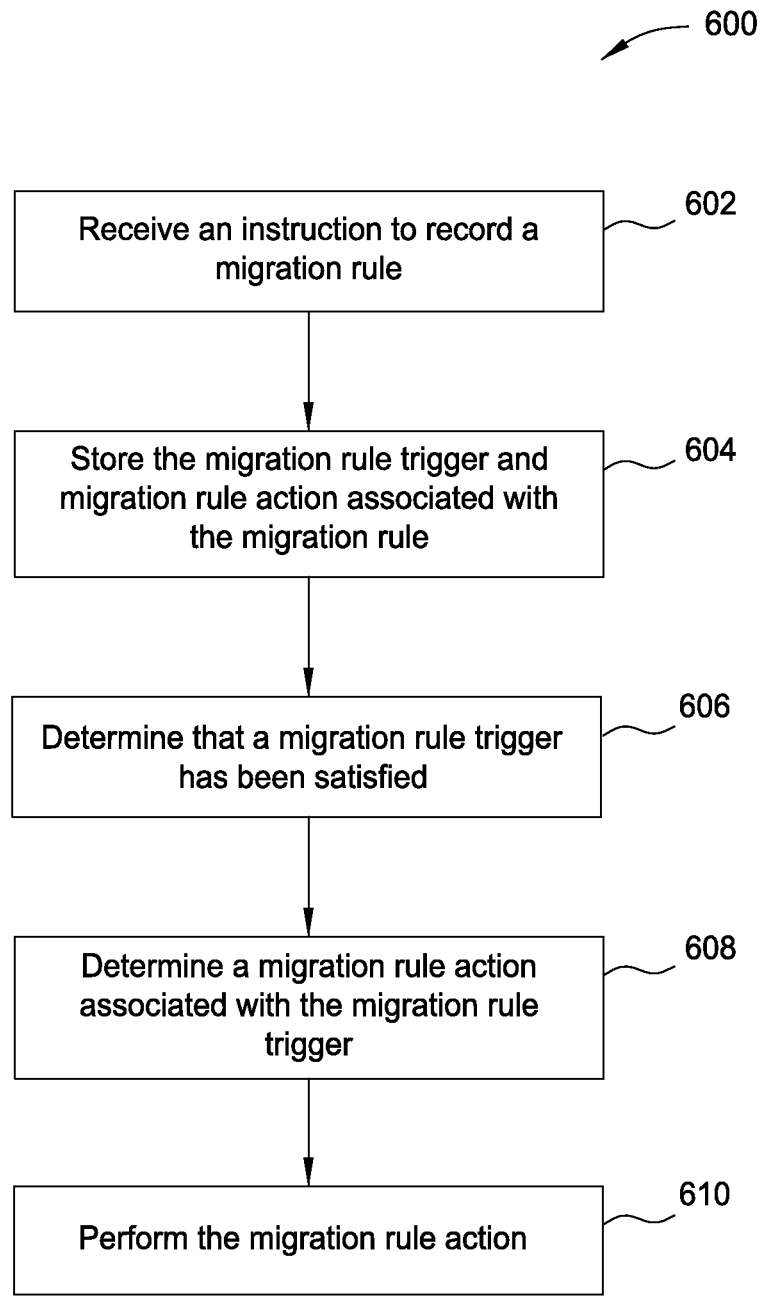
FIG. 6 sets forth a flow diagram of method steps for managing migration rules for controlling migration of memory pages supervised by UVM system, according to one embodiment of the present invention.

FIG. 6 sets forth a flow diagram of method steps for managing migration rules for controlling migration of memory pages supervised by UVM system, according to one embodiment of the present invention. Although the method steps are described in conjunction with FIG. 1-5, persons skilled in the art will understand that any system configured to perform the method steps, in any order, falls within the scope of the present invention.

As shown, a method 600 begins at step 602, where the UVM driver 101 receives an instruction from an application program executing on a CPU 102 or a PPU 202 to record a migration rule. At step 604, the UVM driver 101 stores the migration rule trigger and migration rule action associated with the migration rule that is received. The migration rule trigger and migration rule action may be stored in a PSD 210 and associated with a particular memory page or at another location. At step 606, the UVM driver 101 determines that a migration rule trigger has been satisfied. At step 608, the UVM driver 101 determines the migration rule associated with the migration rule trigger. At step 610, the UVM driver 101 executes the migration rule action.

In sum, techniques are provided for modifying various unified virtual memory settings during program execution are provided. According to these techniques, a compiler translates program code that includes migration rule instructions into an application program including migration system calls. When the application program is executed, the UVM system stores the migration rules specified by the migration system calls. Subsequently, when the UVM system detects a migration rule trigger specified by a particular migration system call, the UVM system executes the migration rule action associated with the migration rule trigger.

One advantage of the disclosed approach is that various settings of the unified virtual memory system may be modified during program execution. This ability to alter the settings allows for an application to vary the manner in which memory pages are migrated and otherwise manipulated, which provides the application the ability to optimize the unified virtual memory system for efficient execution. Another advantage is that a large number of different settings may be altered, which provides the application with a great deal of flexibility in optimizing the unified virtual memory system. A further advantage is that if the migration rule instructions are embodied as compiler directives, then the application program writer may rely on the compiler to determine an appropriate system call. These compiler directives allow an application programmer to write a single set of instructions related to migration rules for multiple different platforms, which speeds up the application development process.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for altering migration rules for a unified virtual memory system, the method comprising:
   detecting that a migration rule trigger associated with a migration rule related to a system call has been satisfied, wherein the migration rule controls the migration of at least one memory page within the unified virtual memory system;
   identifying a migration rule action that is associated with the migration rule trigger; and
   executing the migration rule action.

2. The computer-implemented method of claim 1, further comprising storing both the migration rule trigger and the migration rule action are in a page state directory.

3. The computer-implemented method of claim 1, further comprising generating both the migration rule trigger and the migration rule action based on a compiler directive.

4. The computer-implemented method of claim 1, further comprising detecting the migration rule trigger during execution of an application program based on memory access operations performed by the application program.

5. The computer-implemented method of claim 1, wherein the migration rule trigger includes a memory access operation corresponding to a first data structure.

6. The computer-implemented method of claim 1, wherein the migration rule trigger includes a page fault event associated with a memory page access operation.

7. The computer-implemented method of claim 1, wherein the migration rule trigger includes an immediate event, and detecting that the migration rule trigger has been satisfied comprises determining that an application program executes a system call associated with the migration rule trigger.

8. The computer-implemented method of claim 1, wherein the migration rule action includes changing a page state that is stored in a page state directory and that is associated with a memory page, to modify migration behavior of the unified virtual memory system with respect to the memory page.

9. The computer-implemented method of claim 1, wherein the migration rule action includes transmitting a memory page from a first memory unit to a second memory unit.

10. The computer-implemented method of claim 1, wherein the migration rule action includes changing one or more thrashing settings that specify how the unified virtual memory system responds to repeatedly copying memory pages back and forth between different memory units.

11. A non-transitory computer-readable medium storing instructions, that when executed by a processor, cause a computer system to alter migration rules for a unified virtual memory system, by performing the steps of:
    detecting that a migration rule trigger associated with a migration rule related to a system call has been satisfied, wherein the migration rule controls the migration of at least one memory page within the unified virtual memory system;
    identifying a migration rule action that is associated with the migration rule trigger; and
    executing the migration rule action.

12. The non-transitory computer-readable medium of claim 11, wherein the instructions further cause the computer system to store both the migration rule trigger and the migration rule action in a page state directory.

13. The non-transitory computer-readable medium of claim 11, wherein both the migration rule trigger and the migration rule action are generated based on a compiler directive.

14. The non-transitory computer-readable medium of claim 11, wherein the instructions further cause the computer system to detect the migration rule trigger during execution of an application program based on memory access operations performed by the application program.

15. The non-transitory computer-readable medium of claim 11, wherein the migration rule trigger includes a memory access operation corresponding to a first data structure.

16. A computing device for altering migration rules for a unified virtual memory system, the computing device comprising:
    a unified virtual memory system driver configured to:
        detect that a migration rule trigger associated with a migration rule related to a system call has been satisfied, wherein the migration rule controls the migration of at least one memory page within the unified virtual memory system;
        identify a migration rule action that is associated with the migration rule trigger; and
        execute the migration rule action.

17. The computing device of claim 16, wherein the unified virtual memory system driver is further configured to store both the migration rule trigger and the migration rule action in a page state directory.

18. The computing device of claim 16, wherein both the migration rule trigger and the migration rule action are generated based on a compiler directive.

19. The computing device of claim 16, wherein the unified virtual memory system driver is further configured to detect the migration rule trigger during execution of an application program based on memory access operations performed by the application program.

20. The computing device of claim 16, wherein the migration rule trigger includes a memory access operation corresponding to a first data structure.

21. A computer-implemented method for altering migration rules for a unified virtual memory system, the method comprising:
    detecting that a migration rule trigger has been satisfied;
    identifying a migration rule action that is associated with the migration rule trigger; and
    executing the migration rule action,
    wherein both the migration rule trigger and the migration rule action are generated based on a compiler directive.

* * * * *